June 22, 1937.   L. P. MICHAEL ET AL   2,084,860
LOCOMOTIVE STRUCTURE
Filed Nov. 10, 1934   8 Sheets-Sheet 1
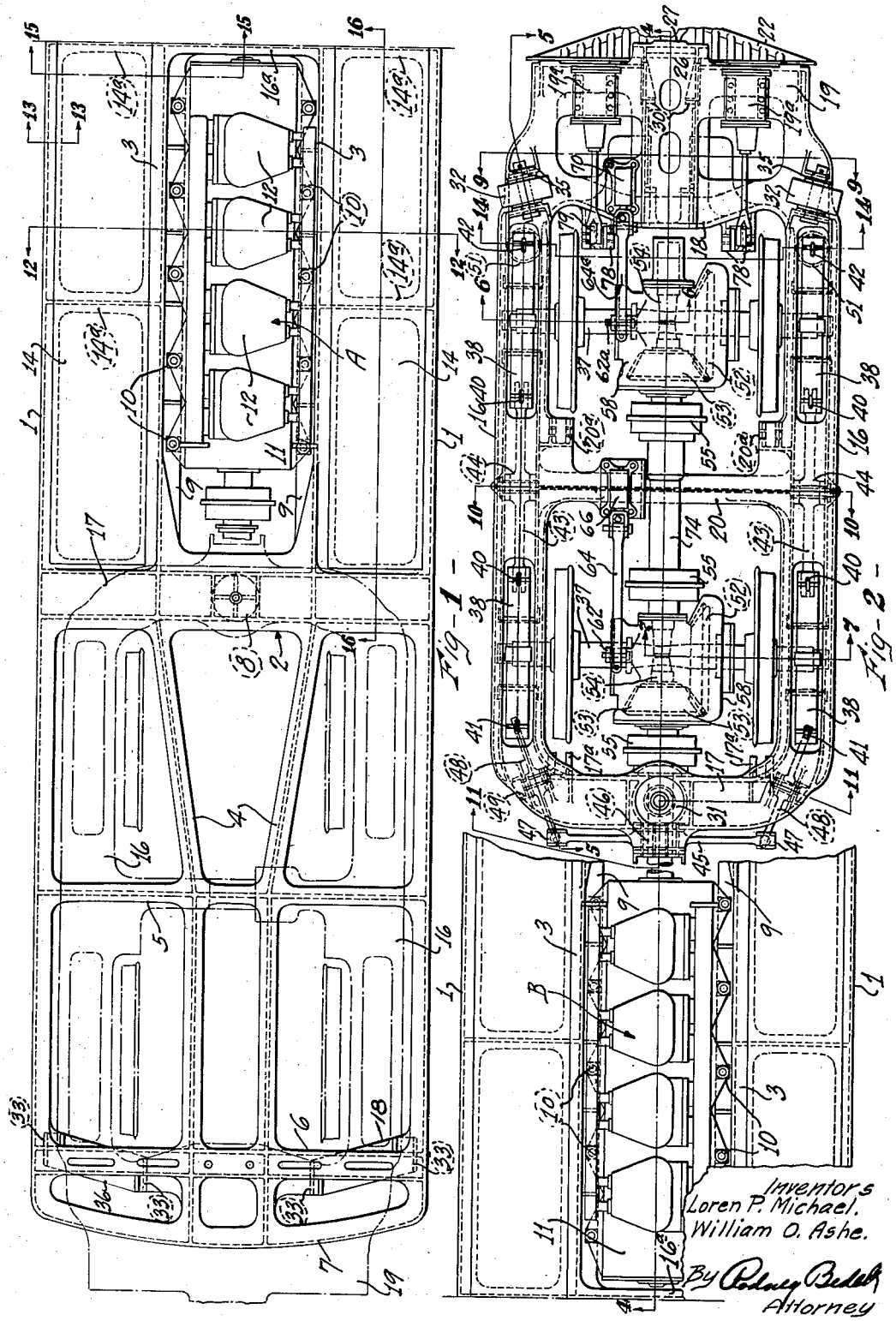
Inventors
Loren P. Michael.
William O. Ashe.
By Rodney Beden
Attorney

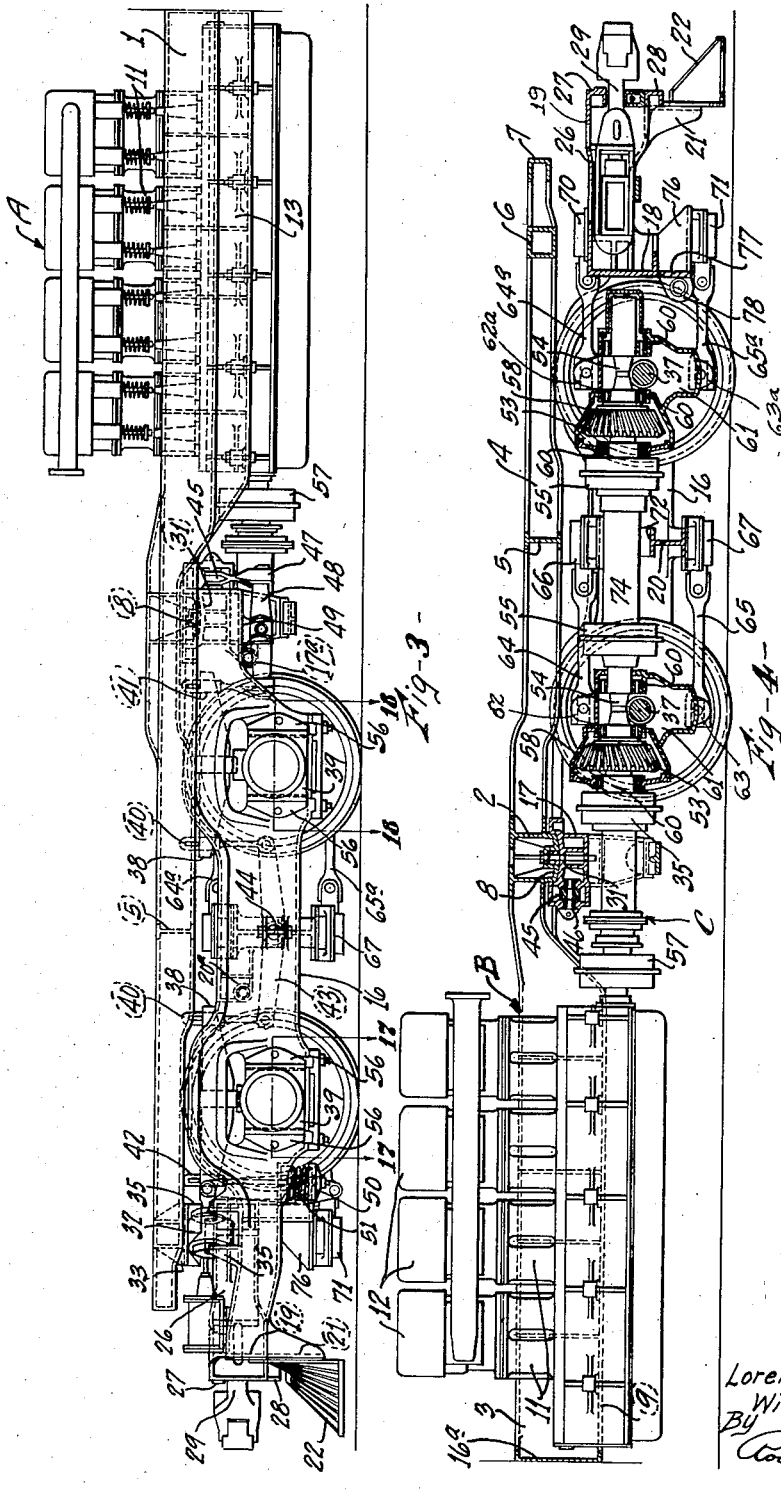

June 22, 1937.  L. P. MICHAEL ET AL  2,084,860
LOCOMOTIVE STRUCTURE
Filed Nov. 10, 1934   8 Sheets-Sheet 3
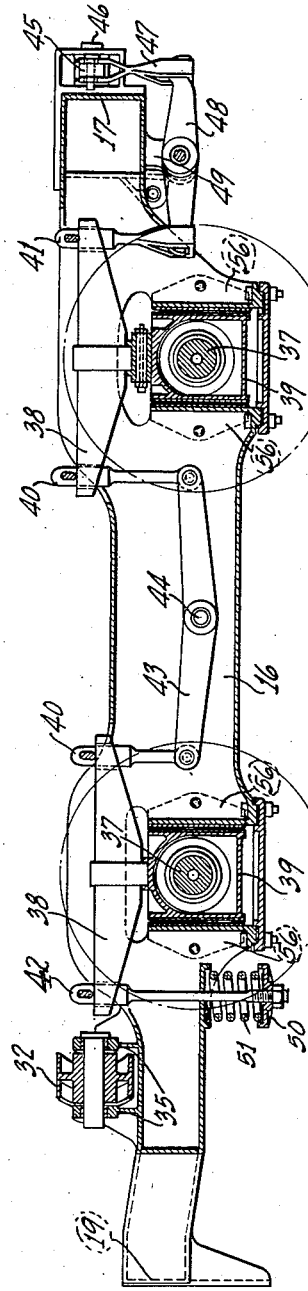
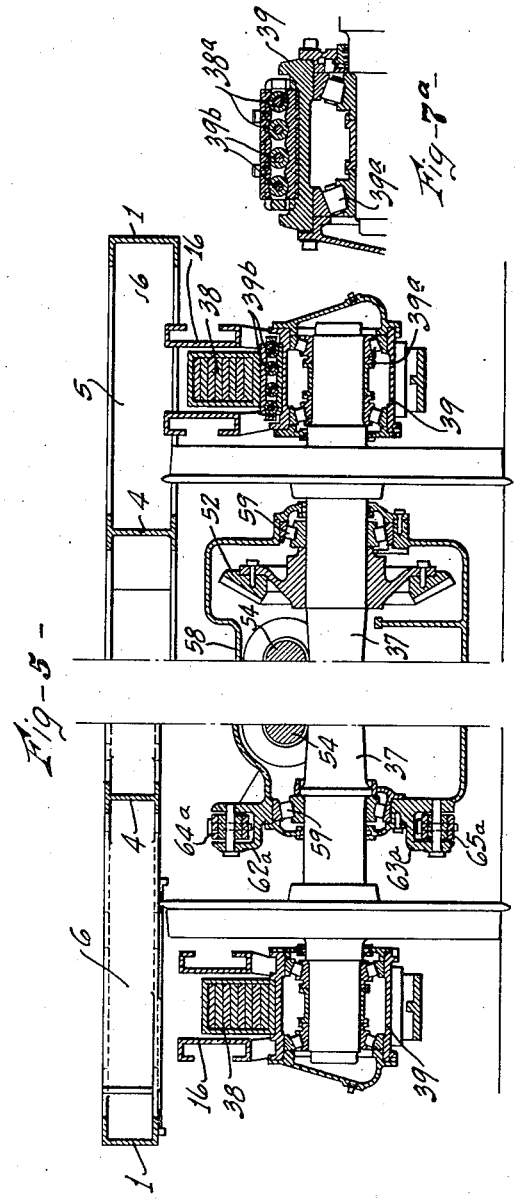
Inventors
Loren P. Michael.
William O. Ashe.
By Rodney Bedell
Attorney June 22, 1937.　　　L. P. MICHAEL ET AL　　　2,084,860
LOCOMOTIVE STRUCTURE
Filed Nov. 10, 1934　　　8 Sheets-Sheet 4
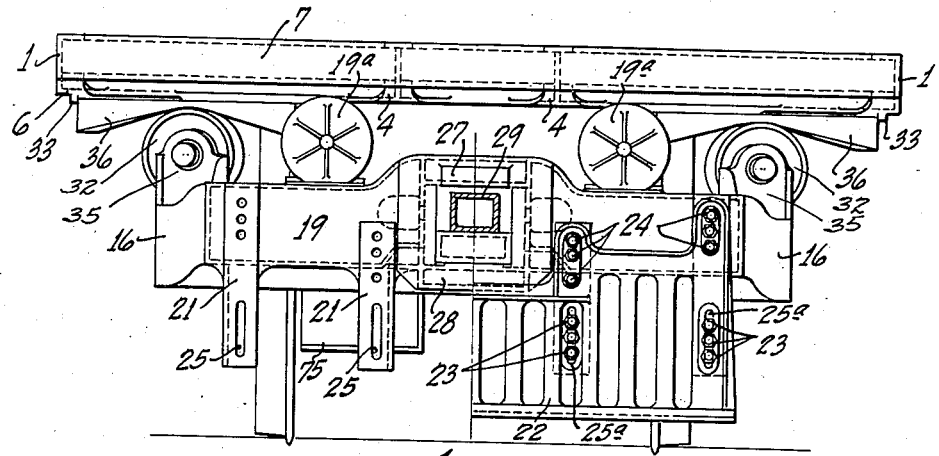
Fig-8-
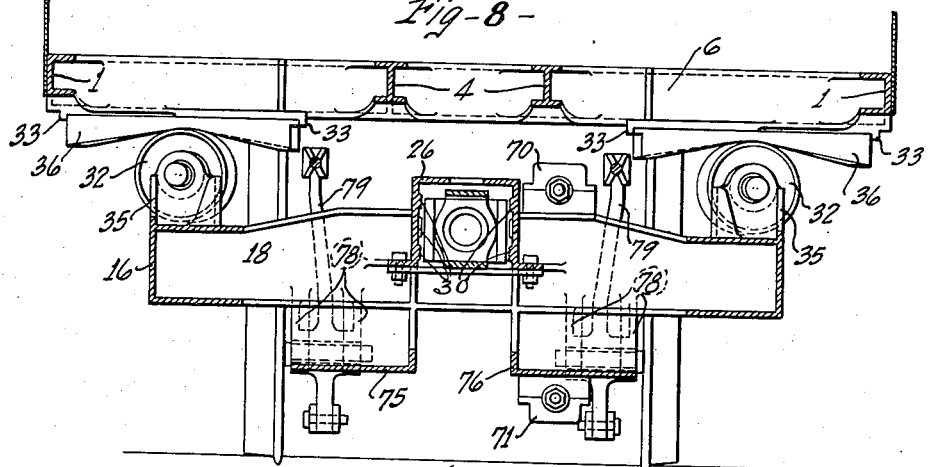
Fig-9-
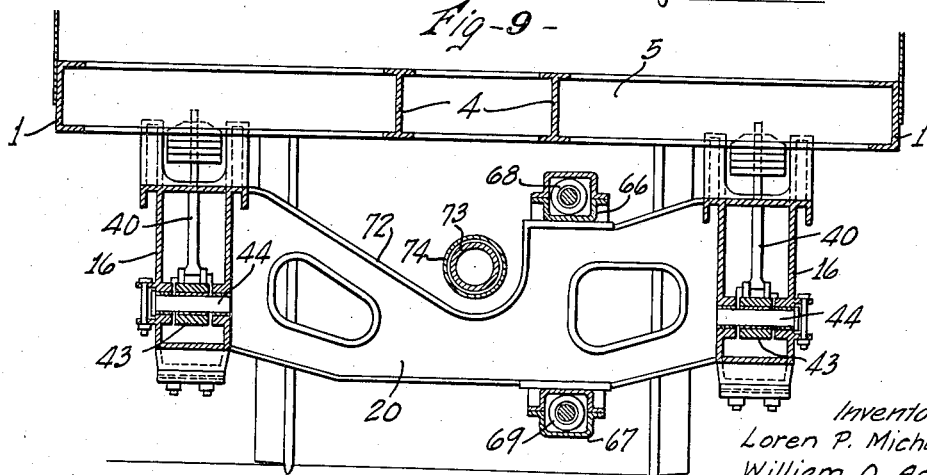
Fig-10-
Inventors
Loren P. Michael.
William O. Ashe.
By Rodney Bedell
Attorney

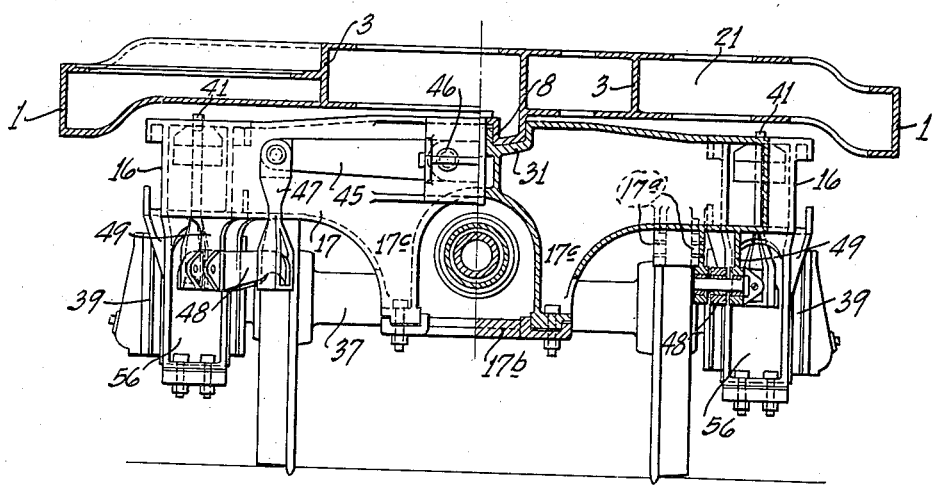
Fig-11-
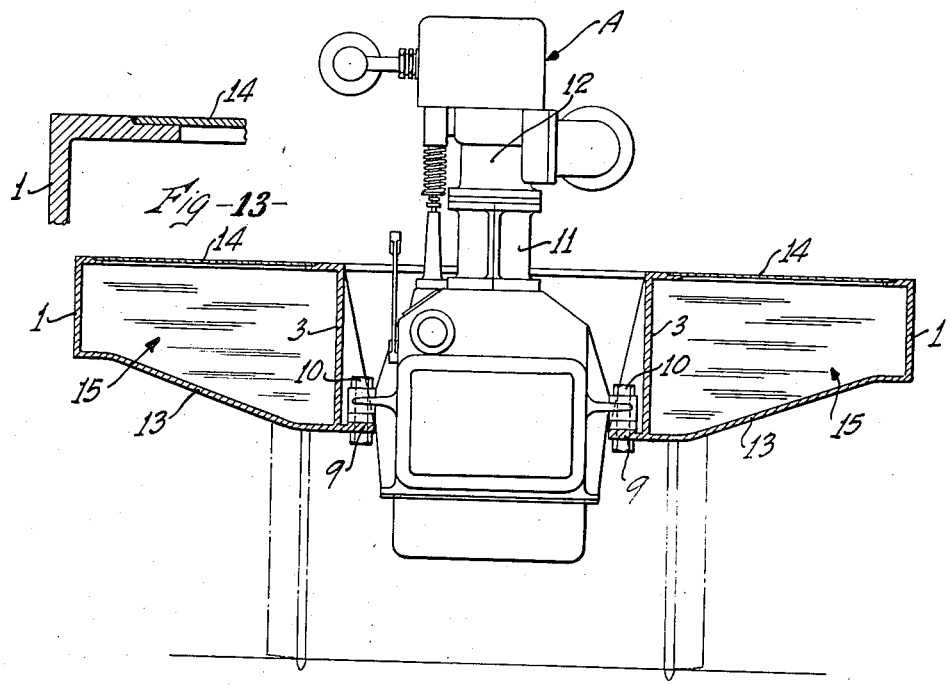
Fig-13-
Fig-12-

June 22, 1937.  L. P. MICHAEL ET AL  2,084,860
LOCOMOTIVE STRUCTURE
Filed Nov. 10, 1934   8 Sheets-Sheet 6
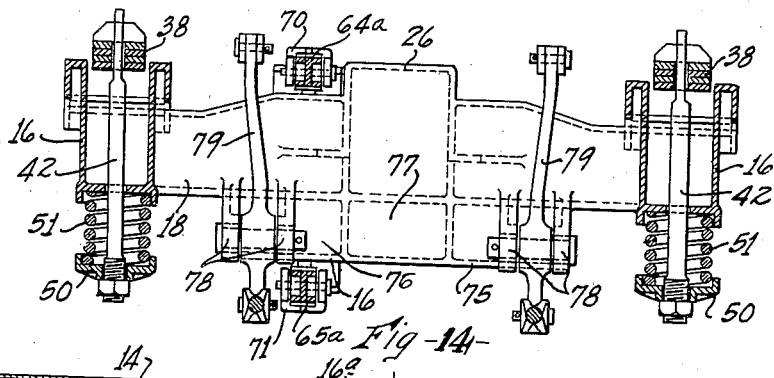
Fig-14-
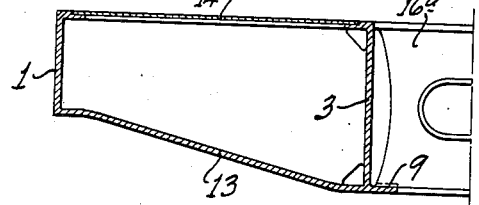
Fig-15-
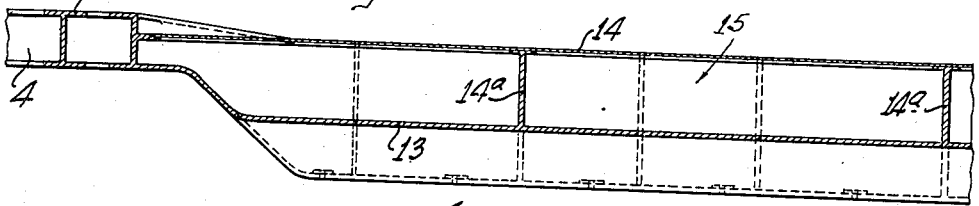
Fig-16-
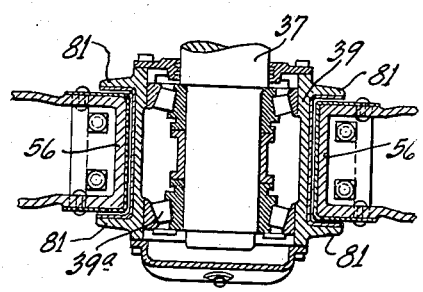
Fig-17-
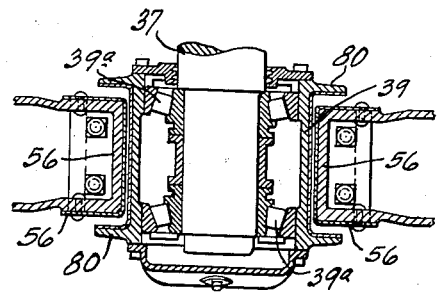
Fig-18-
Inventors
Loren P. Michael.
William O. Ashe.
BY Rodney Iedell
Attorney June 22, 1937.    L. P. MICHAEL ET AL    2,084,860
LOCOMOTIVE STRUCTURE
Filed Nov. 10, 1934    8 Sheets-Sheet 7
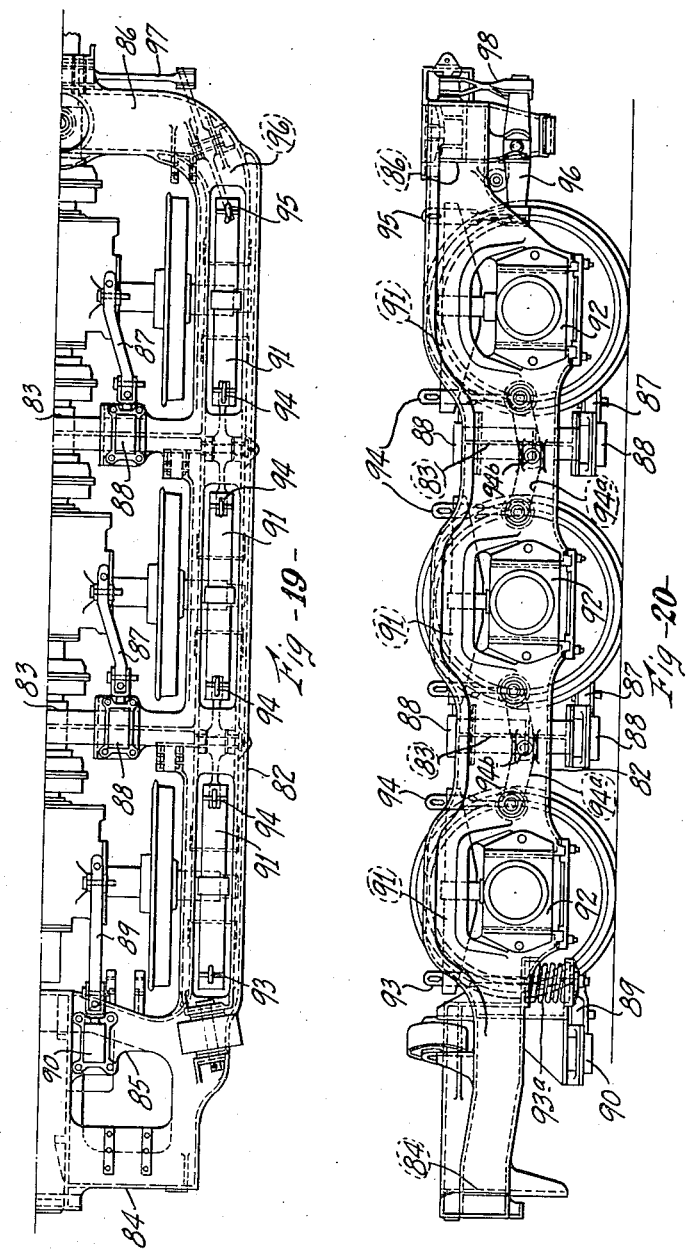
Inventors
Loren P. Michael.
William O. Ashe.
By
Attorney June 22, 1937.  L. P. MICHAEL ET AL  2,084,860
LOCOMOTIVE STRUCTURE
Filed Nov. 10, 1934  8 Sheets-Sheet 8
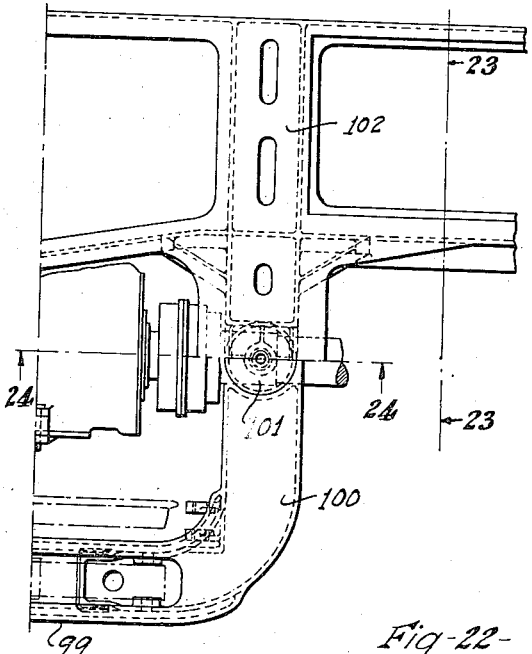
Fig-21-
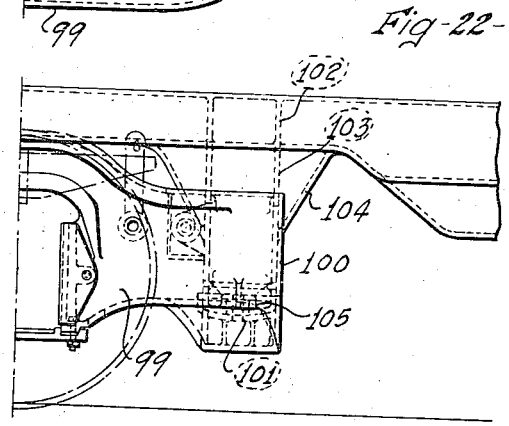
Fig-22-
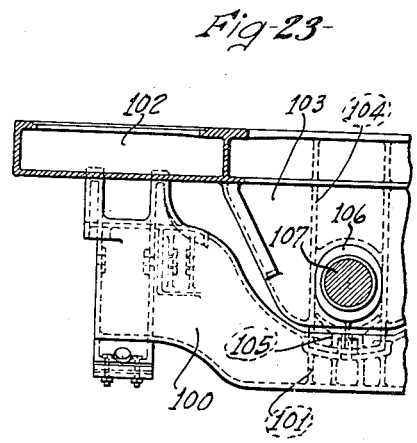
Fig-23-
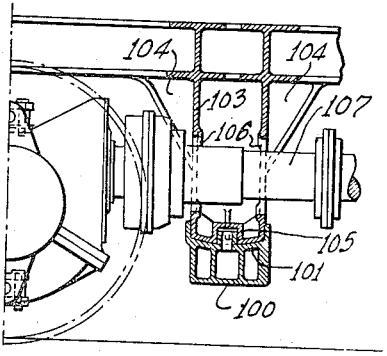
Fig-24-
Inventors
Loren P. Michael.
William O. Ashe.
By Rodney Bedell
Attorney Patented June 22, 1937

2,084,860

UNITED STATES PATENT OFFICE 2,084,860

LOCOMOTIVE STRUCTURE

Loren P. Michael, Elmhurst, Ill., and William O. Ashe, St. Louis, Mo.; said Ashe assignor to General Steel Castings Corporation, Granite City, Ill., a corporation of Delaware Application November 10, 1934, Serial No. 752,426

9 Claims. (Cl. 105—171)

This invention relates to railway rolling stock and consists particularly in novel truck structure for locomotives.

A recent development in railroad locomotive construction has involved the use of a framing resembling the usual car structure including spaced bolsters and trucks with one or more engines intermediate the bolsters and having direct driving connections with the truck axles. The power plant may be high pressure condensing steam engines with the cylinders arranged vertically and requiring relatively small boilers provided with condensers, all mounted on the one locomotive frame, or the power plant may comprise steam turbines, preferably disposed longitudinally of the locomotive, and it is within the scope of the invention to utilize internal combustion engines or motors similarly arranged.

This application is directed to various novel features of the truck construction in an improved locomotive of the above type, the locomotive underframe constituting the subject matter of a divisional application Serial No. 35,712 filed August 12, 1935.

The main object of the present invention is to satisfactorily connect the power plant of a locomotive of the above type to driving wheels on an articulated truck assembled with the locomotive framing.

A more detailed object is to provide novel means for stabilizing gear casings applied to the truck axles.

Another detailed object is to construct the truck so as to accommodate the drive shaft extending between the engines and truck axle gears.

These objects and others are attained by the structures illustrated in the accompanying drawings, in which—

Figure 1 is a top view of the left longitudinal half of a locomotive underframe embodying the invention.

Figure 2 is a top view of the right longitudinal half of the same with a portion of the underframe omitted and disclosing the truck therebeneath.

Figure 3 is a side view of the structure in Figure 1.

Figure 4 is a vertical longitudinal section taken on the line 4—4 of Figure 2, the engine being shown in elevation.

Figure 5 is a similar section taken on the broken line 5—5 of Figure 2.

Figures 6, 7, 9, 10, 11 and 14 are vertical transverse sections taken on the corresponding section lines of Figure 2.

Figure 7a shows an enlarged detail of Figure 7.

Figure 8 is an end view of the underframe and truck and shows a portion of the pilot.

Figures 12, 13 and 15 are vertical transverse sections taken on the corresponding section lines of Figure 1.

Figure 16 is a vertical longitudinal section taken on the line 16—16 of Figure 1.

Figures 17 and 18 are detail horizontal sections taken on the corresponding section lines of Figure 3.

Figures 19 and 20 are top and side views, respectively of a modified form of truck.

Figure 21 is a partial top view of an underframe and truck embodying another modification, the upper half showing the underframe, the lower half showing the truck.

Figure 22 is a side view of the same.

Figure 23 is a vertical transverse section taken on the line 23—23 of Figure 21.

Figure 24 is a vertical longitudinal section taken on the line 24—24 of Figure 21.

In Figures 1 to 18, inclusive, is illustrated an underframe formed as an integral cast metal unit and including side sills 1, bolsters 2, center sills 3 and 4, transverse members 5 and 6, and arcuate end sills 7. The portions 3 of the center sills extend parallel between the bolsters and are of Z-section with their bottom flanges projecting inwardly. The portions 4 of the center sills at each end between the bolster 2 and transverse member 5 extend diagonally inwardly and then extend longitudinally from member 5 to the member 6 and end sill 7. The bolsters 2 have center plate elements 8. The end portions of the underframes between the bolsters and end sills are arranged for mounting the boilers, cabs, and auxiliary equipment (not shown).

Mounted on the inwardly projecting bottom flanges 9 of the center sills 3 by means of the bolts 10 are a pair of engines, generally indicated at A and B, and each including the blocks and bases 11 and heads 12, each engine having eight cylinders. Imperforate webs 13 connect the lower edges of the vertical web portions of each center sill and the adjacent side sill between the bolsters, and the spaces formed thereby are closed at their tops by plates 14 welded to the top edges of the center sill, side sill, and bolster vertical webs and the intermediate flanged ribs 14a to form storage reservoirs 15 for fuel or other fluids. A transverse tie 16a connects the center sills 3 between the engines A and B.

The underframe is carried on the rails by means of a pair of four-wheel trucks which are identical and only one of which will be described.

The frame of each truck includes the hollow box-section wheel pieces 16, transverse end members 17, 18 and 19, and intermediate transom 20. At the intersections of the wheel pieces and transverse members 17 and 20 and on the inner forward corners thereof are the brake hanger brackets 17a and 20a. End member 19 constitutes a pilot beam and has vertically elongated brackets 21 mounting the vertically movable pilot 22 by means of the bolts 23 and 24 and slots 25 and 25a. Extending between the transverse members 18 and 19 is a box-shaped center sill structure 26 having integral striking plate 27 and carry iron 28 for the drawbar 29 illustrated in section in Figure 8 and the usual draft lugs and guides 30. The underframe is carried on each truck by means of a three point support including the pivot 31 on the truck end member 17 for receiving the body center plate structure 8 and the transversely spaced rollers 32 journaled on to the brackets 35 at the intersections of the transverse member 18 and the wheel pieces. The rollers 32 engage bearing seats 36 secured between lugs 33 on the under surfaces of the transverse underframe members 6.

The truck frame is supported upon the wheel axles 37 by means of an equalizing system including elliptic springs 38 resting on the journal boxes 39, having roller bearings 39a, hangers 40, 41 and 42, longitudinal equalizers 43 supported by hangers 40 and pinned to the wheel pieces as at 44, and transverse equalizer 45 pivoted at the center as at 46 to the center of the transverse end member 17 adjacent the center bearing pivot 31. Hangers 47 at each end of transverse equalizer 45 and hangers 41 support the diagonal bars 48 pivoted to the brackets 49 depending from the corners of the underframe. The hangers 42 (Figure 14) support the wheel pieces through the spring hangers and seats 50 and coiled springs 51.

Each truck axle 37 has a gear 52 rigid therewith (Figures 6 and 7) and driven by a pinion 53 on the shaft 54 passing over the top of the axle. Gears 52 and pinions 53 are of hyperboloidal design and are accurately formed in order to operate noiselessly and without vibration. The shafts 54 on each truck are connected by a shaft 73 and universal and telescoping joints, generally indicated at 55, and form a flexible drive shaft permitting free play of the respective axles and journal boxes within the pedestals 56 under the spring action. The inner shaft 54 is connected with the adjacent engine B through universal and telescoping joint 57 and a clutch C.

Enclosing each gear 52, pinion 53, and drive shaft 54 is a gear casing 58 mounted on the axle 37 by means of rolling bearings 59. The shaft 54 is supported within the gear casing by bearings 60. At the bottom of the casing is a sump 61 forming a lubricant reservoir and within which may be conveniently mounted an oil pump (not shown) for directing lubricant against the gear teeth and into the bearings.

In order to resist rotation of the gear casing and the resultant increased torque on the drive shaft, each casing 58 at one side has the lugs 62, 62a, 63 and 63a to which are pinned the upper and lower torque arms 64, 64a, and 65 and 65a. The arms 64 and 65 secured to the innermost gear casing are attached to the intermediate transverse member 20 by means of brackets 66 and 67 and spring connections 68 and 69, shown in Figure 10. The torque arms 64a and 65a extending from the outer gear casing are secured to the transverse frame member 18 by brackets and spring connections 70 and 71 corresponding to the brackets and springs 66, 67, 68 and 69 in Figure 10.

The intermediate transverse member 20 is deeply recessed (Figure 10) in its upper surface at 72 to clear the portion 73 of the drive shaft extending between adjacent universal joints 55 and having the casing 74. As shown in Figure 9, the transverse member 18 has depending members 75 and 76. These members are connected by a web 77 forming a continuation of the inner wall of member 18 (Figures 4 and 14). The members 75 and 76 each have fulcrums 78 for the brake levers 79. The depending member 76 also includes the bracket 71 mounting the spring connection for the lower torque arm 65a. The member 17 at the end of the truck frame has depending jaws 17c (Figure 11) with a recess therebetween directly beneath pivot structure 31 and closed at the bottom by bar 17b for accommodating the drive shaft. Member 19 at the opposite end of the truck has pads on its upper surface for mounting the brake cylinders 19a.

As shown in Figures 17 and 18, outermost journal boxes 39 have ribs 81 rather snugly enclosing the pedestals 56. The innermost boxes 39 have ribs 89 loosely enclosing the pedestal ribs 80 which permit approximately an inch of relative lateral play between the boxes and pedestals. Mounted on the outermost boxes are constant centering devices including seats 38a and rollers 39b and the elliptic spring 38. The lateral play of the journal boxes and the lateral motion devices serve to prevent breaking and excessive wearing of the wheel tires in rounding curves.

In Figures 19 and 20 is shown a truck corresponding in general to the trucks illustrated in the previous form except that six wheels are provided instead of four. The truck frame includes wheel pieces 82, a pair of intermediate transoms 83, and transverse end members 84, 85 and 86. The torque arms 87 are attached to the transoms 83 by means of yielding connections 88 and the torque arms 89 are attached to the transverse member 85 by means of yielding connection 90. The equalizing system supporting the truck frame includes elliptic springs 91 resting on each of the journal boxes 92 and carrying hangers 93, 94 and 95. The hangers 93 support one end of the frame through the coiled springs 93a. The hangers 94 support the ends of equalizer bars 94a pivoted to the wheel pieces as at 94b. The hangers 95 cooperate with diagonal bars 96, transverse equalizer 97, and hangers 98 to equalize the spring systems on each side of the truck. The body is supported on the central pivot on the end member 86 and on the rollers mounted on the wheel pieces near the ends of transverse member 85. The six-wheel truck illustrated is intended for supporting a heavier locomotive than the four-wheel trucks in the previous form. In locomotives of the present type the six-wheel trucks are utilized with engines developing 3,000 H. P. and four-wheel trucks are used with engines developing 2,000 H. P., although these power ratings are obviously merely suggestive.

In Figures 21 to 24 is shown a modified form of pivotal connection of the truck with the body underframe. The truck includes wheel pieces 99 and a transverse end member 100 having a depending middle part including the pivotal center bearing attachment 101. The underframe bolster 102 corresponding to the bolster 2 in Figure 1 has a bracket 103, braced by ribs 104, depending from its central portion into the recess formed in the upper surface of the truck end member 100 and has the body center bearing 105 for cooperating with the truck pivot 101. Bracket 103 also includes an aperture 106 for receiving the drive shaft 107 which passes above the center bearings in this form.

The main reason for the use of a truck pivoted at one end, is to reduce the angularity of the engine drive shaft with respect to the truck drive shaft to the axles.

If the usual construction of truck with center plate located in the center of truck were used, with as long a wheel base as is desired with a four or six wheel truck of such design, it would make the angularity of the truck driving shaft with respect to the engine shaft too great to operate satisfactorily and to transmit high horse power and, likely, it would make a practically impossible condition.

With the truck pivoted at one end and one universal joint in the drive shaft located over or near this pivot point, and the second universal joint located near the power unit, the angularity of the driving shaft parts of both universal joints will be reduced to a minimum which will permit high horse powers to be transmitted practically.

The novel high pressure, condensing steam engine for which the described underframe and truck are especially intended is lighter than railroad locomotives in general use at this time but all of the weight is carried on the driving wheels. The locomotive is well adapted for high speed service on long passenger runs as well as the lower speeds necessary in suburban service. The underframe is rigid, strong and durable throughout and properly reinforced and shaped in its various parts for supporting the engine and its equipment without embodying excessive metal and restricted areas of metal concentration which are incidental in built-up underframes and trucks. The gear casings are firmly but yieldingly maintained in their proper positions by the torque arms having resilient connections with the truck frame and adequate provisions are made for accommodating the drive shafts extending between the engines carried by the underframe and the gears on the truck axles.

While a single type of steam engine has been illustrated and described, it is to be understood, as indicated in the introductory portion of the specification, that steam turbines and internal combustion engines or other power plants may be substituted for the engine illustrated and such departure from the illustrated structure and various modifications in the parts of the underframe and truck structure may be made without departing from the spirit of the invention, and the exclusive use of all such modifications as come within the scope of the claims is contemplated.

We claim:

1. In a railway truck frame, structure at one end for pivotal support of a vehicle body, said structure including an element for pivotal attachment of a transverse spring equalizer for supporting the truck frame.

2. In a railway truck frame, transverse transom structure for pivotally supporting a vehicle body, said structure providing a downwardly opening recess for accommodating a drive shaft, there being a member extending below said recess to brace the lower portion of said transom at each side of said recess and thereby increase the effective depth of the transom.

3. In a railway truck frame, a transverse transom having a portion of substantial depth from end to end of the transom and including an element for pivotal support of a vehicle body, depending elements on said transom for accommodating a drive shaft extending longitudinally of the truck, and a tie bar extending transversely of the truck below said drive shaft connecting the lower portions of said elements.

4. In a railway truck frame, wheel pieces, an end transom connecting said wheel pieces and having an upwardly facing center plate structure for supporting a vehicle body and having a part for pivoting a transverse member for supporting the frame and equalizing the load on the truck springs.

5. In a railway truck frame, wheel pieces, a transom of substantial depth connecting said wheel pieces with a downwardly opening recess in its intermediate part extending upwardly above the level of the bottom of its ends, said recess being adapted to accommodate a drive shaft, said transom extending downwardly at each side of said recess and the lower parts of the downwardly extending portions being braced to each other.

6. In a truck of the class described, a frame, spaced axles journaled therein, a vehicle support at the center of one end of said frame, vehicle supports at the sides of the other end of said frame, springs mounted on the ends of said axles, and a spring equalizing system anchored to said frame adjacent to each of said side supports and including elements pivoted respectively to said frame intermediate said axles and adjacent to said center support.

7. In a truck of the class described, a frame, spaced axles journaled therein, a body supporting transom at one end of said frame, body supporting members at the sides of the opposite end of said frame, springs carried by said axles, a continuous spring equalizing system supporting said frame from said axles, said frame and transom being arranged to accommodate gear casings mounted on both of said axles, and a driving shaft extending through said transom and communicating with said gear casings.

8. In a truck of the class described, a frame including wheel pieces, transverse structure connecting said wheel pieces at each end of the truck, a body supporting member at the center of the transverse structure at one end of the truck, body supporting members at the sides of the transverse structure at the other end of the truck, a center sill intermediate said latter mentioned members, brake cylinders carried on said latter mentioned transverse structure at opposite sides of said center sill, and brake gear connections extending from said cylinders and connected to brake gear at the respective sides of said structure.

9. In a truck of the class described, a frame, spaced axles journaled therein, a vehicle support at the center of one end of said frame, vehicle supports at the sides of the other end of said frame, springs mounted on the ends of said axles, and a spring equalizing system anchored to said frame adjacent to each of said side supports and including a cross equalizer pivoted to said frame adjacent said center support.

LOREN P. MICHAEL.
WILLIAM O. ASHE.